United States Patent
Yoo et al.

(10) Patent No.: US 9,285,936 B2
(45) Date of Patent: Mar. 15, 2016

(54) DISPLAY APPARATUS AND METHOD OF DRIVING THE SAME

(71) Applicant: Samsung Display Co., Ltd., Yongin, Gyeonggi-do (KR)

(72) Inventors: Hee-Soo Yoo, Yongin (KR); Mu-Gyeom Kim, Yongin (KR); Chang-Yong Jeong, Yongin (KR); Seong-Min Wang, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 35 days.

(21) Appl. No.: 14/073,708

(22) Filed: Nov. 6, 2013

(65) Prior Publication Data

US 2014/0176504 A1    Jun. 26, 2014

(30) Foreign Application Priority Data

Dec. 21, 2012  (KR) ......................... 10-2012-0150372

(51) Int. Cl.
*G06F 3/042*  (2006.01)
*G06F 3/044*  (2006.01)
*G06F 1/32*   (2006.01)

(52) U.S. Cl.
CPC .............. *G06F 3/044* (2013.01); *G06F 1/3265* (2013.01); *G09G 2310/0232* (2013.01); *G09G 2320/0686* (2013.01); *G09G 2330/021* (2013.01)

(58) Field of Classification Search
None
See application file for complete search history.

(56) References Cited

U.S. PATENT DOCUMENTS

| 6,847,386 | B2 * | 1/2005 | Paleiov | 345/684 |
| 2006/0192766 | A1 | 8/2006 | Nakamura et al. | |
| 2006/0277482 | A1 * | 12/2006 | Hoffman et al. | 715/764 |
| 2009/0312065 | A1 * | 12/2009 | Wang et al. | 455/566 |
| 2011/0037576 | A1 * | 2/2011 | Jeon et al. | 340/407.2 |

FOREIGN PATENT DOCUMENTS

| KR | 10-0781483 B1 | 11/2007 |
| KR | 10-2011-0070046 A | 6/2011 |
| KR | 10-2011-0113501 A | 10/2011 |

* cited by examiner

*Primary Examiner* — Nicholas Lee
(74) *Attorney, Agent, or Firm* — Knobbe, Martens, Olson & Bear, LLP

(57) ABSTRACT

A display apparatus is disclosed. In one aspect the apparatus includes a touch panel, an information processor, a memory and a display panel. The touch panel generates a current touch signal including a current touch position of a touch. The information processor receives the current touch signal from the touch panel and a stored touch signal to compare the stored touch signal with the current touch signal to generate dynamic luminance information. The memory receives the current touch signal from the information processor to store the current touch signal as the stored touch signal. The display panel receives the dynamic luminance information from the information processor to display an image having different luminances in an emphasizing region corresponding to the current touch signal and the stored touch signal and a background region surrounding the emphasizing region, respectively.

16 Claims, 13 Drawing Sheets

DISPLAY APPARATUS AND METHOD OF DRIVING THE SAME

CROSS-REFERENCE TO RELATED APPLICATION(S)

This application claims priority under 35 USC §119 to Korean Patent Applications No. 10-2012-0150372, filed on Dec. 21, 2012 in the Korean Intellectual Property Office (KIPO), the contents of which are incorporated herein in its entirety by reference.

BACKGROUND

1. Technical Field

The described technology generally relates to a display apparatus and a method of driving the display apparatus.

2. Description of the Related Technology

A flat panel display apparatus has various characteristics such as low power consumption, thin thickness, small size, etc. Thus, the flat panel display apparatus has been widely used in various fields. The flat panel display apparatus includes a transparent substrate, an optical film, etc., of thin thickness, and other electric elements mounted on the transparent substrate. Thus, the flat panel display apparatus has been widely used in portable devices.

SUMMARY

One inventive aspect is a display apparatus capable of dynamic individual touch controlling.

Another aspect is a method of driving the display apparatus.

Another aspect is a display apparatus which includes a touch panel, an information processing part, a storing part and a display panel. The touch panel generates a current touch signal including a current touch position of a touch. The information processing part receives the current touch signal from the touch panel and a stored touch signal to compare the stored touch signal with the current touch signal to generate dynamic luminance information. The storing part receives the current touch signal from the information processing part to store the current touch signal as the stored touch signal. The display panel receives the dynamic luminance information from the information processing part to display an image having different luminances in an emphasizing region corresponding to the current touch signal and the stored touch signal and a background region surrounding the emphasizing region, respectively.

In example embodiments, the luminance of the emphasizing region may be greater than the luminance of the background region.

In example embodiments, the luminance of the emphasizing region may be lower than the luminance of the background region.

In example embodiments, the current touch signal may further include a touch time information.

In example embodiments, the information processing part may include a touch time information of the stored touch signal with a reference transition time and a termination time to change a portion of the emphasizing region, which corresponds to a touch position of the stored touch signal, into a transition region when the touch time information exceeds the reference transition time, and the information processing part to change a portion of the transition region, which corresponds to the touch position of the stored touch signal, into the background region when the touch time information exceeds the termination time.

In example embodiments, the touch panel may be integrally formed with the display panel.

In example embodiments, the touch panel may be successively touched, and the emphasizing region may expand based on the successive tough of the touch panel.

In example embodiments, the emphasizing region may have a width corresponding to a predetermined buffer interval.

In example embodiments, the emphasizing region may be one successive region.

In example embodiments, the emphasizing region may include a plurality of disconnected regions.

Another aspect is a display apparatus which includes a touch panel, an information processing part, a storing part, a display panel and a backlight assembly. The touch panel generates a current touch signal having a touch position information of a touch. The information processing part receives the current touch signal from the touch panel and a stored touch signal to compare the stored touch signal and the current touch signal, thereby generating dynamic luminance information and an image signal. The storing part receives the current touch signal from the information processing part to store the current touch signal as the stored touch signal. The display panel receives the image signal from the information processing part to display an image. The backlight assembly includes a plurality of individually driving light sources, and receiving the dynamic luminance information from the information processing part to generate light having different luminances in an emphasizing region corresponding to the stored touch signal and a background region surrounding the emphasizing region.

Another aspect is a display apparatus which includes a display panel and a touch panel integrally formed with the display panel. In a method of driving the display apparatus, a current touch signal including touch position information is detected. A current touch position is determined as a portion of an emphasizing region when the touch position information of the current touch signal is not disposed in the emphasizing region. An image having an emphasizing luminance and a background luminance that is different from the emphasizing luminance is displayed in the emphasizing region and a background region that surrounds the emphasizing region, respectively, to dynamic individual control the display panel.

In example embodiments, the emphasizing region may be determined by comparing the current touch signal with the stored touch signal.

In example embodiments, the luminance of the emphasizing region may be greater than the luminance of the background region.

In example embodiments, the luminance of the emphasizing regions may be lower than the luminance of the background region.

In example embodiments, the method may further include storing the current touch signal to generate a stored touch signal.

In example embodiments, the current touch signal may further include a touch time information, and the method may further include comparing the touch time information of the stored touch signal to change a portion of the emphasizing region, which corresponds to a touch position of the stored touch signal, into a transition region, when the touch time information exceeds the reference transition time.

In example embodiments, the method may further include comparing the touch time information of the stored touch signal to change a portion of the transition region, which corresponds to a touch position of the stored touch signal, into the background region, when the touch time information exceeds the termination time, and the luminance of the transition region may be between the luminance of the emphasizing region and the luminance of the background region.

In example embodiments, the current touch signal may further include a touch time information, and the method may further include detecting whether the current touch signal is a first signal, and setting a vertical coordinate of the current touch signal as a reference emphasizing point when the current touch signal is the first signal.

In example embodiments, the method may further include newly setting a vertical coordinate of the touch position information as the reference emphasizing point when the touch time information of the current touch signal exceeds a buffer time and the vertical coordinate of the touch position information of the current touch signal exceeds a buffer interval.

DETAILED DESCRIPTION

Figure 1:
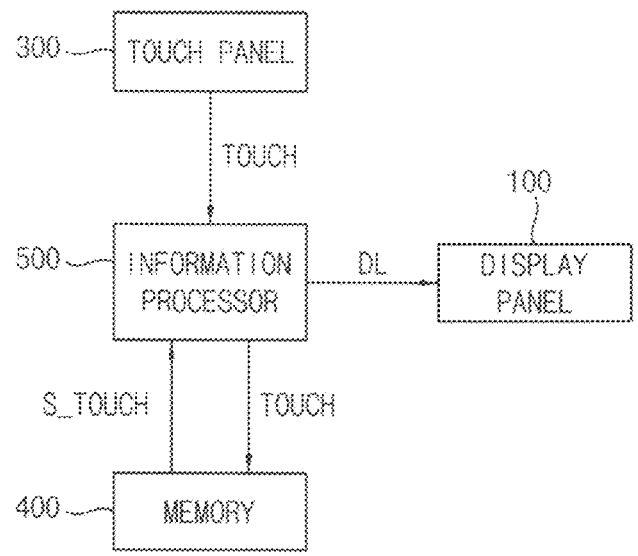
FIG. 1 is a block diagram illustrating a display apparatus according to one example embodiment.

Generally, portable devices with flat panel displays receive electric power from a rechargeable battery, so that their portability depends on power consumption. When the power consumption of the flat panel display apparatus decreases, the portability of the flat panel display apparatus increases. Thus, various technologies for decreasing the power consumption of the flat panel display apparatus have been developed.

Luminance of the flat panel display apparatus is sensitive to the power consumption. Thus, when the luminance of the flat panel display apparatus decreases, the power consumption of the flat panel display apparatus also decreases. However, when the luminance of the flat panel display apparatus decreases, contrast ratio of the flat panel display apparatus decreases, thereby deteriorating image display quality.

Various example embodiments will be described more fully hereinafter with reference to the accompanying drawings. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
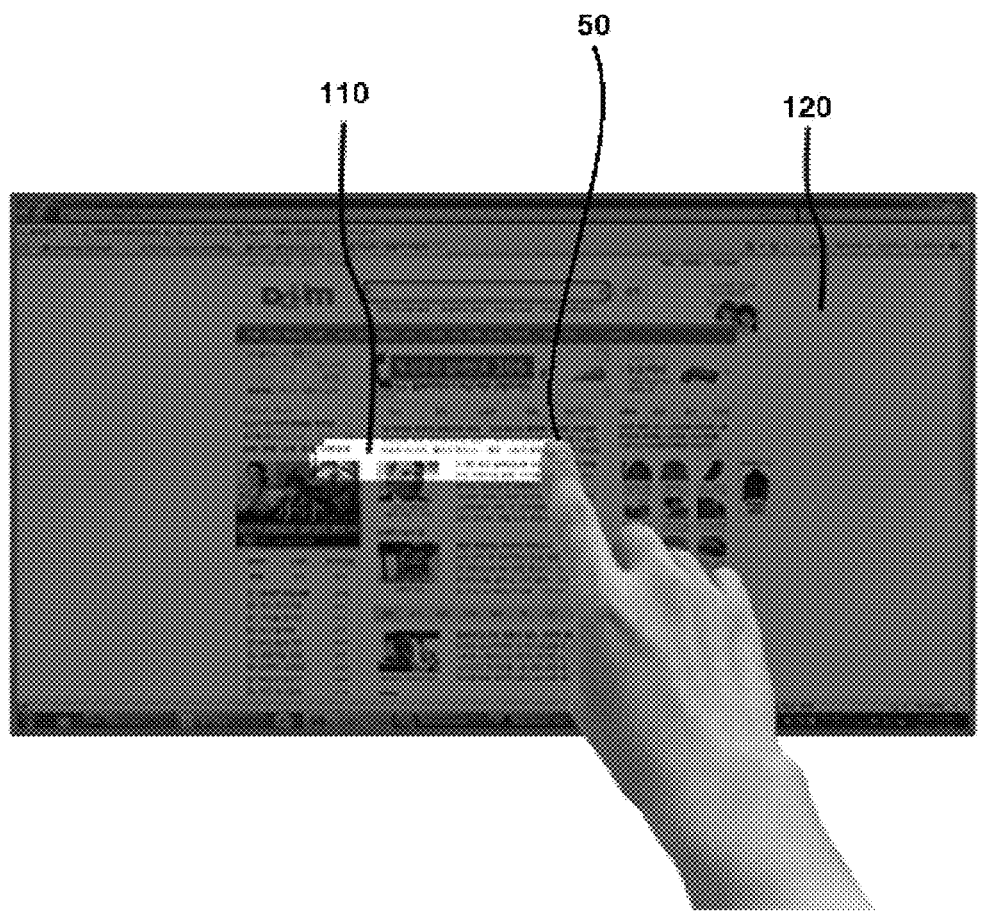
FIG. 2 is an image displayed on the display apparatus of FIG. 1.
Figure 3:
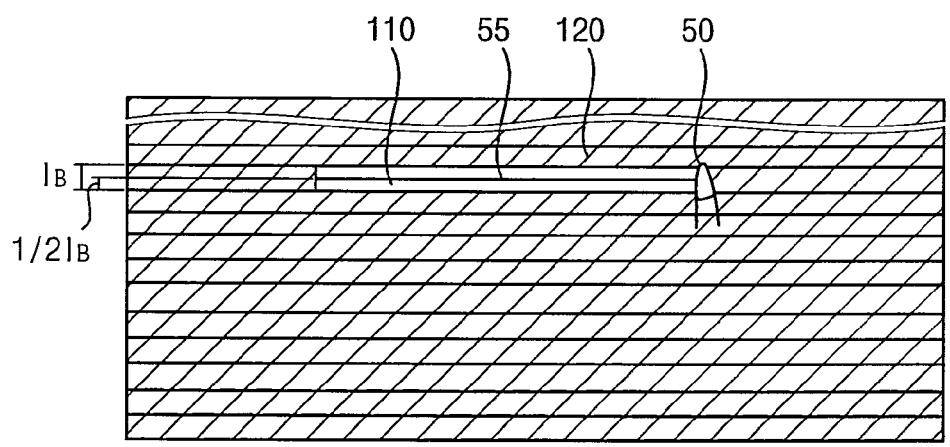
FIG. 3 is a plan view illustrating a method of driving the display apparatus of FIG. 1.

FIG. 1 is a block diagram illustrating a display apparatus according to one example embodiment. FIG. 2 is an image displayed on the display apparatus of FIG. 1. FIG. 3 is a plan view illustrating a method of driving the display apparatus of FIG. 1.

Referring to FIGS. 1 to 3, the display apparatus includes a display panel 100, a touch panel 300, a storing part (or a memory) 400 and an information processing part (or an information processor) 500.

The display panel 100 receives dynamic luminance information DL from the information processing part 500 to display an image with different luminances in an emphasizing region 110 and a background region 120, respectively. For example, the emphasizing region 110 has greater luminance than the background region 120. Alternatively, the emphasizing region 110 may have lower luminance than the background region 120. Alternatively, the display panel 100 may display an image with different colors in the emphasizing region 110 and the background region 120, respectively.

The touch panel 300 is disposed on the display panel 100. For example, the touch panel 300 is integrally formed with the display panel 100. Alternatively, the touch panel 300 may be integrated on the same substrates and same lines as the display panel 100. Alternatively, the touch panel 300 may be laminated with the display panel 100.

The touch panel 300 includes a plurality of touch sensors. For example, each of the touch sensors senses variation of capacitance, pressure, resistance, current, voltage, luminance, etc., by a touch of a finger, a pointer, etc. For example, the touch sensors include a plurality of lines crossing each other to sense the variation of the capacitance by the touch.

The touch panel 300 senses the touch that is externally provided from the touch panel 300 to generate a current touch signal TOUCH. The current touch signal TOUCH includes touch position information that has a horizontal coordinate and a vertical coordinate, a touch time information, etc. The current touch signal TOUCH generated from the touch panel 300 is applied to the information processing part 500.

The storing part 400 receives the current touch signal TOUCH from the information processing part 500 to store the current touch signal TOUCH. For example, the storing part 400 sequentially receives a plurality of current touch signals TOUCH to store the sequentially received current touch signals TOUCH.

The information processing part 500 receives a stored touch signal S_TOUCH stored in the storing part 400, the current touch signal TOUCH from the touch panel 300 to generate dynamic luminance information DL. The information processing part 500 sets a region corresponding to the current touch signal TOUCH and the stored touch signal S_TOUCH as the emphasizing region 110, and sets a remaining region as the background region 120. The dynamic luminance information DL includes information of arranging the emphasizing and background regions 110 and 120.

The information processing part 500 also stores the current touch signal TOUCH that is provided from the touch panel 300 in the storing part 400.

Referring to FIGS. 2 and 3, the emphasizing region 110 is expanded by successive touches. For example, the touch panel 300 is touched by a finger 50. The emphasizing region 110 having a width of a predetermined buffer interval $I_B$ (see FIG. 3) is set from a first touch point along a moving path 55 of the finger 50. For example, the buffer interval $I_B$ is set from $+\frac{1}{2} I_B$ to $-\frac{1}{2} I_B$ with respect to the moving path 55 of the finger 50. Alternatively, a predetermined interval may be set to be the buffer interval, and the emphasizing region may be set at a predetermined interval based on the center of the finger 50.

Figure 4:
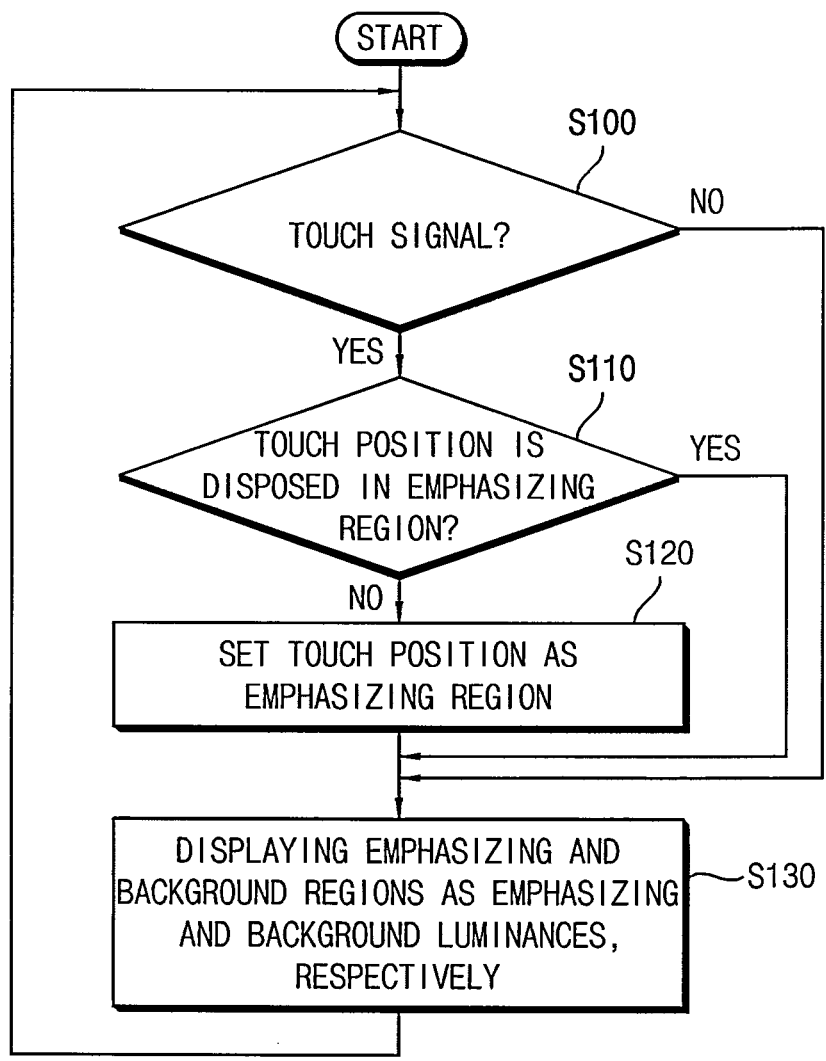
FIG. 4 is a flowchart illustrating a display apparatus according to one example embodiment.

FIG. 4 is a flowchart illustrating a display apparatus according to one example embodiment.

Referring to FIGS. 1 to 4, the touch signal TOUCH is detected (step S100). When the touch panel 300 is touched by the finger 50, the touch panel 300 generates the current touch signal TOUCH to apply the current touch signal TOUCH to the information processing part 500. When the information processing part 500 receives the current touch signal TOUCH from the touch panel 300, the current touch signal TOUCH is determined to be detected. The current touch signal TOUCH includes the information of the touch position. When the current touch signal TOUCH is not detected, the process proceeds to step S130.

The touch position of the current touch signal TOUCH is detected to be disposed in the emphasizing region 110 (step S110). When the touch position of the current touch signal TOUCH is disposed in the emphasizing region 110, additional emphasizing region 110 is not necessary, thereby proceeding to the step S130.

When the touch position of the current touch signal TOUCH is not disposed in the emphasizing region 110, the touch position of the current touch signal TOUCH is set to add the emphasizing region 110 (step S120). For example, the emphasizing region 110 includes the touch position of the current touch signal TOUCH, and is expanded toward the touch position of the current touch signal TOUCH based on the current touch signal TOUCH generated by the movement of the finger 50. That is, the emphasizing region 110 is expanded along the moving path 55 of the finger 50 as the process is repeated.

An image having the emphasizing and background luminances is displayed in the emphasizing region 110 and the background region 120, respectively (step S130). The information processing part 500 generates the dynamic luminance information DL based on the stored touch signal S_TOUCH from the storing part 400 and the current touch signal TOUCH from the touch panel 300 to apply the dynamic luminance information DL to the display panel 100. The dynamic luminance information DL includes the emphasizing region 110 and the background region 120. The display panel 100 displays the image at a bright luminance in the emphasizing region 110 and a dark luminance in the background region 120.

The steps S100 to S130 are repeated.

According to the above-mentioned example embodiment, the emphasizing region 110 is set by the touch of the finger 50, and the luminance of the emphasizing region 110 is greater than the background region 120. Thus, the emphasizing region 110 is set only in the region touched by the finger 50, so that power consumption of the display apparatus is decreased.

Figure 5:
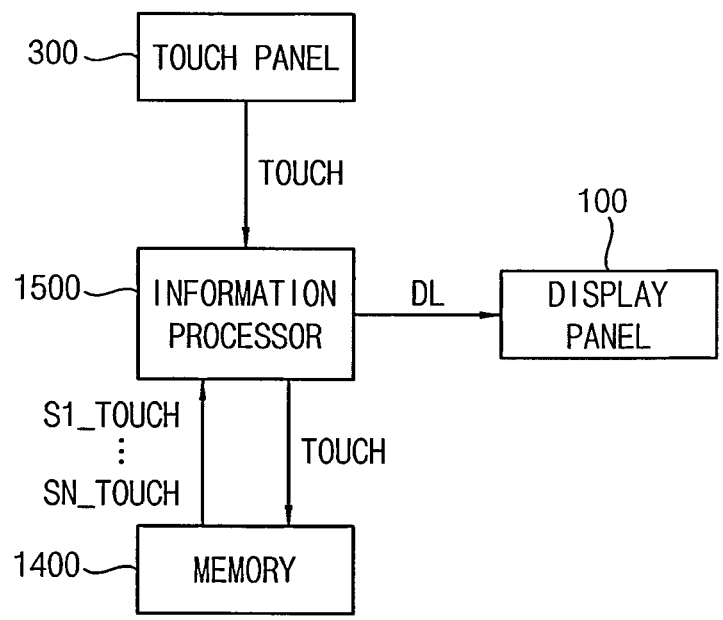
FIG. 5 is a block diagram illustrating a display apparatus according to another example embodiment.
Figure 6:
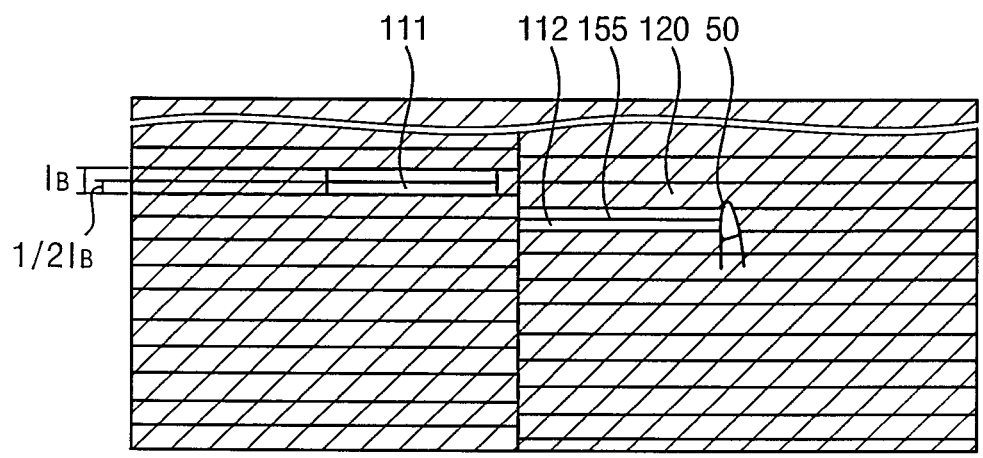
FIG. 6 is a plan view illustrating a method of driving the display apparatus of FIG. 5.

FIG. 5 is a block diagram illustrating a display apparatus according to another example embodiment. FIG. 6 is a plan view illustrating a method of driving the display apparatus of FIG. 5. The display apparatus of FIGS. 5 and 6 is substantially the same as shown in FIGS. 1 to 4 except the emphasizing region, the information processing part and the storing part. Thus, any repetitive explanations concerning the same elements will be omitted.

Referring to FIGS. 5 and 6, the display apparatus includes a display panel 100, a touch panel 300, a storing part 1400 and an information processing part 1500.

The display panel 100 receives dynamic luminance information DL from the information processing part 1500 to display an image with different luminances in a plurality of emphasizing regions 111 and 112 and a background region 120, respectively. For example, the emphasizing regions 111 and 112 have greater luminance than the background region 120.

The touch panel 300 is disposed on the display panel 100. For example, the touch panel 300 is integrally formed with the display panel 100.

The touch panel 300 includes a plurality of touch sensors. The touch panel 300 senses the touch that is externally provided from the touch panel 300 to generate a current touch signal TOUCH. The current touch signal TOUCH includes touch position information that has a horizontal coordinate and a vertical coordinate, a touch time information, etc. The current touch signal TOUCH generated from the touch panel 300 is applied to the information processing part 1500.

The storing part 1400 receives the current touch signal TOUCH from the information processing part 1500 to store a plurality of stored touch signals S1_TOUCH, . . . , SN_TOUCH. The stored touch signals S1_TOUCH, . . . , SN_TOUCH correspond to the emphasizing regions 111 and 112, respectively. For example, the storing part 1400 sequentially receives the current touch signal TOUCH to store two stored touch signals S1_TOUCH and $S2_{13}$ TOUCH corresponding to the two emphasizing regions 111 and 112, respectively.

The information processing part 1500 receives the stored touch signal S1_TOUCH and S2_TOUCH stored in the storing part 1400, the current touch signal TOUCH from the touch panel 300 to generate dynamic luminance information DL. The information processing part 1500 sets regions corresponding to the current touch signal TOUCH and the stored touch signals S1_TOUCH and S2_TOUCH as the emphasizing regions 111 and 112, and sets a remaining region as the background region 120. The dynamic luminance information DL includes an information of arranging the emphasizing and background regions 111, 112 and 120.

The information processing part 1500 also stores the current touch signal TOUCH that is provided from the touch panel 300 in the storing part 1400.

Referring to FIG. 6, the emphasizing regions 111 and 112 are expanded by successive touches. For example, the touch panel 300 is touched by a finger 50. The first emphasizing region 111 having a width of a predetermined buffer interval $I_B$ is set from a first touch point along a moving path 155 of the finger 50. The second emphasizing region 112 having a width of the buffer interval $I_B$ is set from a second touch point along a moving path 155 of the finger 50. For example, the buffer interval $I_B$ is set from +½ $I_B$ to −½ $I_B$ with respect to the moving path 155 of the finger 50. For example, the first emphasizing region 111 and the second emphasizing region 112 are disposed on right and left sides of the display panel 100 so that the first emphasizing region 111 is not overlapped with the second emphasizing region 112. Alternatively, the first and second emphasizing regions 111 and 112 may be disposed on up and down sides of the display panel 100.

The moving path 155 of the finger 50 may not be continuously connected. For example, a broken line may be interposed in the moving path 155 of the finger 50. For example, the emphasizing regions 111 and 112 are set only based on the current touch signal TOUCH generated by the touch of the finger 50. Thus, when the moving path 155 of the finger is not continuously connected, the emphasizing regions 111 and 112 are not continuously connected but divided into the first and second emphasizing region 111 and 112. For example, the emphasizing regions 111 and 112 may be formed in regions in which the finger 50 is touched.

According to the present exemplary embodiment, a plurality of the emphasizing regions 111 and 112 may be formed by various touch of the finger 50.

Figure 7:
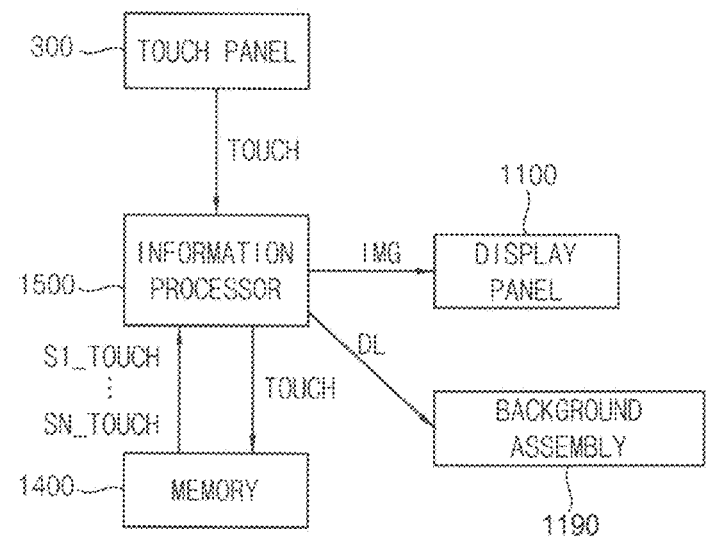
FIG. 7 is a block diagram illustrating a display apparatus according to still another example embodiment.

FIG. 7 is a block diagram illustrating a display apparatus according to still another example embodiment. The display apparatus of FIG. 7 is substantially the same as shown in FIGS. 1 to 4 except the display panel, the backlight assembly, the information processing part and the storing part. Thus, any repetitive explanations concerning the same elements will be omitted.

Referring to FIGS. 6 and 7, the display apparatus includes a display panel 1100, a backlight assembly 1190, a touch panel 300, a storing part 1400 and an information processing part 1500.

The display panel 1100 receives an image signal IMG from the information processing part 1500 to display an image. Alternatively, the display panel 1100 may receive the image signal IMG from other circuit elements such as a panel driving circuit (not shown), an externally provided module (not shown), etc. For example, the display panel 1100 does not include a light emissive element, but includes a plurality of passive type elements that displays an image using a light provided from the backlight assembly 1190. The passive type elements may include a liquid crystal element, a light shutter element, an electrophoretic display element (EPD), etc.

The backlight assembly 1190 includes a plurality of light sources arranged in various arrangements. The light sources of the backlight assembly 1190 are individually driven. For example, the light sources of the backlight assembly 1190 are arranged in a matrix shape, and have lower resolution than the display panel 1100. Alternatively, the light sources of the backlight assembly 1190 may be arranged in a diamond' shape, a honeycomb shape, etc. Alternatively, the light sources of the backlight assembly 1190 may include a linear light sources arranged in a vertical direction, and the emphasizing regions 111 and 112 may have a linear shape. Examples of the linear light sources arranged in a vertical direction may include a cold cathode fluorescent lamp (CCFL).

The backlight assembly 1190 receives the dynamic luminance information DL from the information processing part 1500 to supply the display panel 1100 with the light of different luminances in a plurality of emphasizing regions 111 and 112 and a background region 120, respectively. For example, the emphasizing regions 111 and 112 have greater luminance than the background region 120.

The touch panel 300 is disposed on the display panel 1100. For example, the touch panel 300 is integrally formed with the display panel 1100.

The touch panel 300 includes a plurality of touch sensors. The touch panel 300 senses the touch that is externally provided from the touch panel 300 to generate a current touch signal TOUCH. The current touch signal TOUCH includes touch position information that has a horizontal coordinate and a vertical coordinate, a touch time information, etc. The current touch signal TOUCH generated from the touch panel 300 is applied to the information processing part 1500.

The storing part 1400 receives the current touch signal TOUCH from the information processing part 1500 to store a plurality of stored touch signals S1_TOUCH, . . . , SN_TOUCH. The stored touch signals S1_TOUCH, . . . , SN_TOUCH correspond to the emphasizing regions 111 and 112, respectively. For example, the storing part 1400 sequentially receives the current touch signal TOUCH to store two stored touch signals S1_TOUCH and S2_TOUCH corresponding to the two emphasizing regions 111 and 112, respectively.

The information processing part 1500 receives the stored touch signal S1_TOUCH and S2_TOUCH stored in the storing part 1400, the current touch signal TOUCH from the touch panel 300 to generate dynamic luminance information DL. The information processing part 1500 sets regions corresponding to the current touch signal TOUCH and the stored touch signals S1_TOUCH and S2_TOUCH as the emphasizing regions 111 and 112, and sets a remaining region as the background region 120. The dynamic luminance information DL includes information of arranging the emphasizing and background regions 111, 112 and 120.

In the present example embodiment, the information processing part 1500 applies the image signal IMG and the dynamic luminance information DL to the display panel 1100 and the backlight assembly 1190, respectively. Alternatively, the image signal IMG may be compensated based on the dynamic luminance information DL, and the information processing part 1500 applies the compensated image signal IMG to the display panel 1100.

The information processing part 1500 also stores the current touch signal TOUCH that is provided from the touch panel 300 in the storing part 1400.

According to the present exemplary embodiment, the backlight assembly 1190 including the individually driven light sources to selectively the light having high luminance to the emphasizing regions 111 and 112, thereby decreasing power consumption of the display apparatus.

Figure 8:
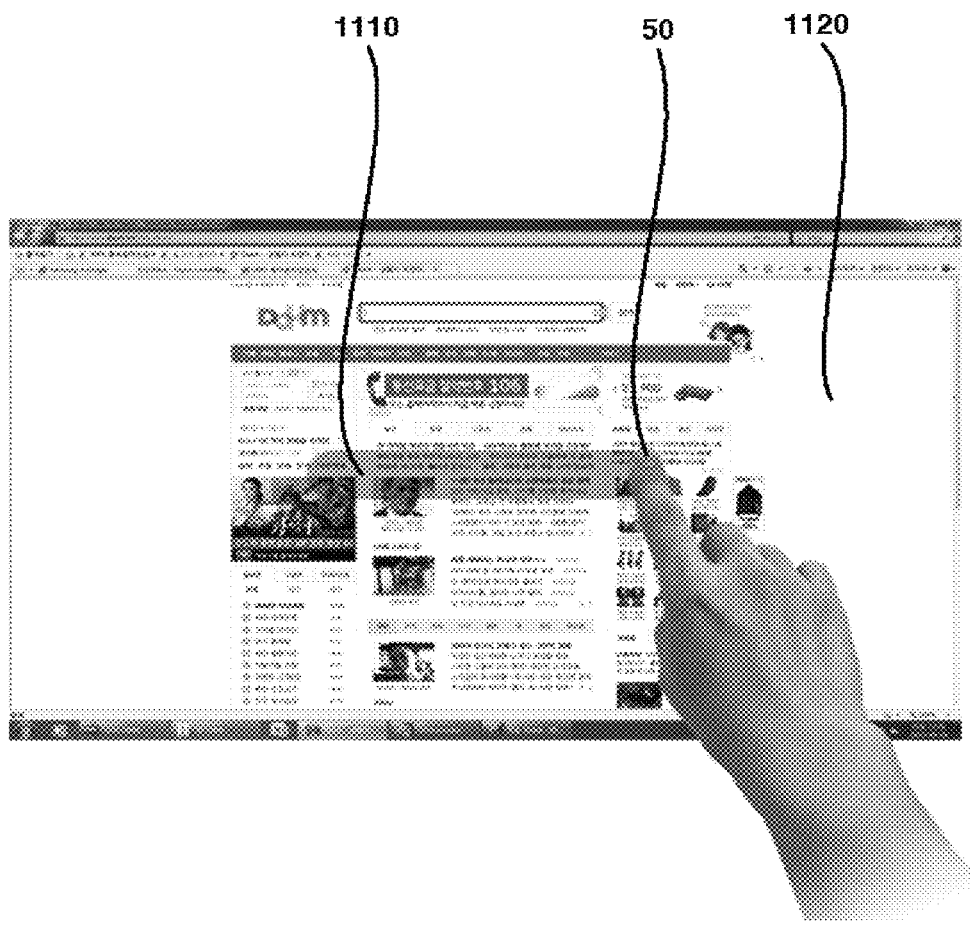
FIG. 8 is an image displayed on a display apparatus according to further still another example embodiment.

FIG. 8 is an image displayed on a display apparatus according to further still another example embodiment of the present invention. The display apparatus of FIG. 8 is substantially the same as shown in FIGS. 1 to 4 except the emphasizing region and the background region. Thus, any repetitive explanations concerning the same elements will be omitted.

Referring to FIGS. 1 and 8, the display panel 100 receives dynamic luminance information DL from an information processing part 500 to display an image having different luminances in an emphasizing region 1110 and a background region 1120, respectively. For example, the emphasizing region 1110 has lower luminance than the background region 1120. When the emphasizing region 1110 has lower luminance than the background region 1120, the image may be easily recognized at a bright place.

The relationship between the luminances of the emphasizing and background regions 1110 and 1120 may be changed by a mode transition. For example, the information processing part 500 may include various modes that may be changed by a user, and may have a first mode in which the emphasizing region 110 has greater luminance than the background region 120 as shown in FIG. 2 and a second mode in which the emphasizing region 1110 has lower luminance than the background region 1120.

According to the present example embodiment, the emphasizing region 1110 has lower luminance than the background region 1120, so that the image may be easily recognized at a bright place.

Figure 9:
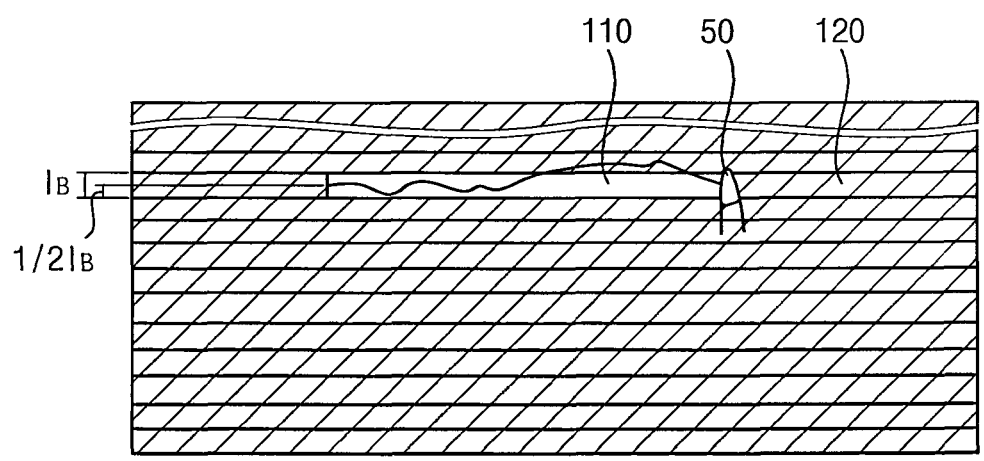
FIG. 9 is a plan view illustrating a driving method of a display apparatus according to further still another example embodiment.
Figure 10:
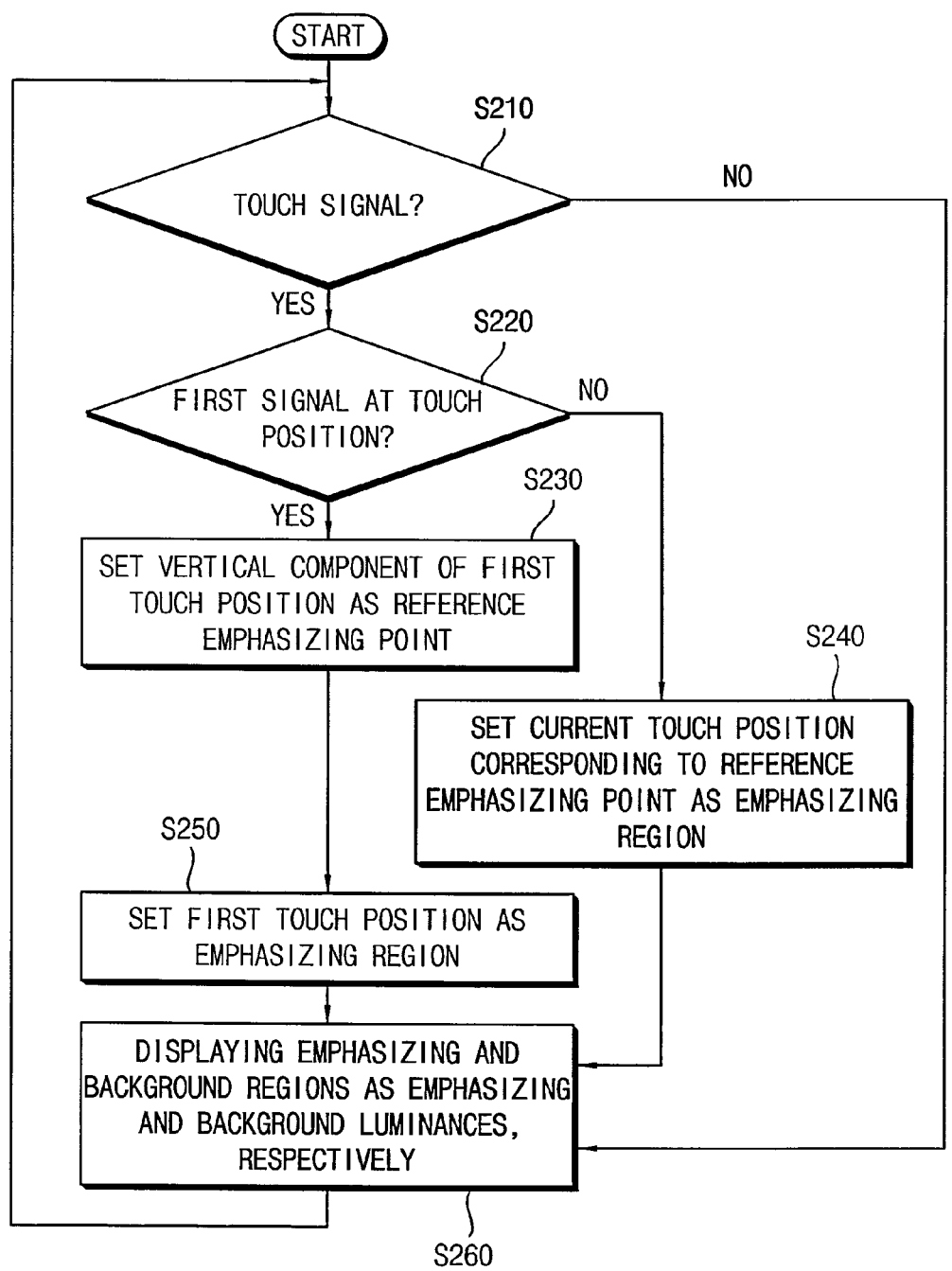
FIG. 10 is a flowchart illustrating the method of driving the display apparatus of FIG. 9.
Figure 11:
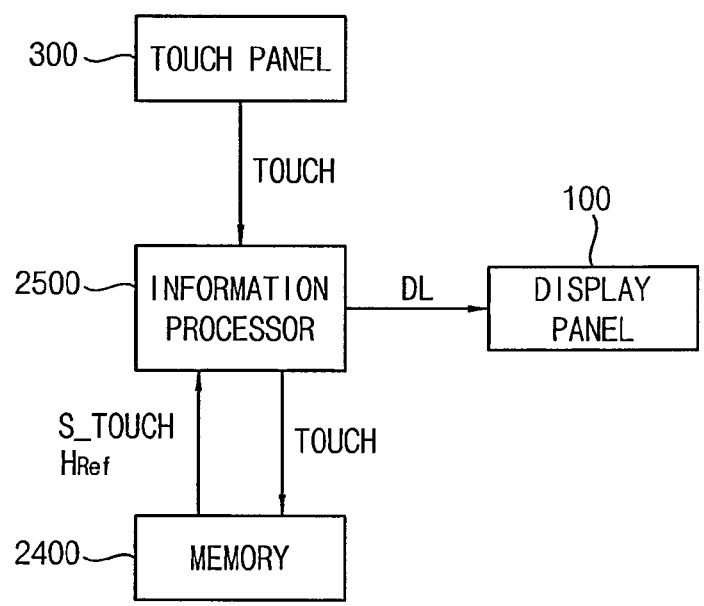
FIG. 11 is a block diagram illustrating the display apparatus of FIG. 9.

FIG. 9 is a plan view illustrating a driving method of a display apparatus according to further still another example embodiment of the present invention. FIG. 11 is a block diagram illustrating the display apparatus of FIG. 9. The display apparatus of FIGS. 9 and 10 is substantially the same as shown in FIGS. 1 to 4 except the emphasizing region, the information processing part and the storing part. Thus, any repetitive explanations concerning the same elements will be omitted.

Referring to FIGS. 9 and 11, the display apparatus includes a display panel 100, a touch panel 300, a storing part 2400 and an information processing part 2500.

The display panel 100 receives dynamic luminance information DL from the information processing part 2500 to display an image with different luminances in an emphasizing region 110 and a background region 120, respectively. For example, the emphasizing region 110 has greater luminance than the background region 120.

The touch panel 300 is disposed on the display panel 100. For example, the touch panel 300 is integrally formed with the display panel 100. The touch panel 300 includes a plurality of touch sensors. The touch panel 300 senses the touch that is externally provided from the touch panel 300 to generate a current touch signal TOUCH. The current touch signal TOUCH includes touch position information that has a horizontal coordinate and a vertical coordinate. The current touch signal TOUCH generated from the touch panel 300 is applied to the information processing part 2500.

The storing part 2400 receives the current touch signal TOUCH and an information of a reference emphasizing point $H_{Ref}$ from the information processing part 2500. For example, the storing part 2400 may sequentially receive a plurality of the current touch signals TOUCH to sequentially store the current touch signals TOUCH.

The information processing part 2500 receives the stored touch signal S_TOUCH stored in the storing part 2400, the information of the reference emphasizing point $H_{Ref}$ stored in the storing part 2400 and the current touch signal TOUCH from the touch panel 300 to generate a dynamic luminance information DL.

The reference emphasizing point $H_{Ref}$ corresponds to a vertical coordinate of a center of a finger 50 that is firstly touched. In order to reduce error in setting the reference emphasizing point $H_{Ref}$, the information processing part 2500 sets the vertical coordinate of the center of the firstly stored touch signal S_TOUCH as the reference emphasizing point $H_{Ref}$ only when the position of the current touch signal TOUCH is adjacent to the position of the firstly stored touch signal S_TOUCH. That is, although two points that are spaced apart from each other are temporally adjacently touched, the reference emphasizing point is not set.

The information processing part 2500 compares the current touch signal TOUCH and the stored touch signal S_TOUCH to extract the horizontal coordinate of the stored touch signal S_TOUCH and the vertical coordinate of the reference emphasizing point $H_{Ref}$. Thus, the emphasizing region 110 is set based on the horizontal coordinate of the stored touch signal S_TOUCH and the vertical coordinate of the reference emphasizing point $H_{Ref}$. Remaining region is set to be the background region 120. The dynamic luminance information DL includes the arrangement of the emphasizing region 110 and the background region 120.

The information processing part 2500 applies the dynamic luminance information DL.

FIG. 10 is a flowchart illustrating the method of driving the display apparatus of FIG. 9.

Referring to FIGS. 9 to 11, the touch signal TOUCH is detected (step S210). When the touch panel 300 is touched by the finger 50, the touch panel 300 generates the current touch signal TOUCH to apply the current touch signal TOUCH to the information processing part 2500. When the information processing part 2500 receives the current touch signal TOUCH from the touch panel 300, the current touch signal TOUCH is determined to be detected. The current touch signal TOUCH includes the information of the touch position. When the current touch signal TOUCH is not detected, the process proceeds to step S260.

The current touch signal TOUCH is compared with a stored touch signal S_TOUCH to determine whether the current touch signal TOUCH is the first signal (step S220). When the stored touch signal S_TOUCH is adjacent to the current touch signal TOUCH by spatially and temporally, the information processing part 2500 set the stored touch signal S_TOUCH as a first signal. When the stored touch signal S_TOUCH is not adjacent to the current touch signal TOUCH by spatially and temporally, the information processing part 2500 set the stored touch signal S_TOUCH as a touch error. When the stored touch signal S_TOUCH is not exist in the storing part 2400, the information processing part 2500 stores the current touch signal TOUCH in the storing part 2400.

When the current touch signal TOUCH is the first signal, the information processing part 2500 sets a vertical coordinate of a first touch position as the reference as the reference emphasizing point $H_{Ref}$ (step S230), and sets the first touch position as the emphasizing region 110 (step S250).

When the current touch signal TOUCH is not the first signal, the information processing part 2500 sets a region corresponding to the reference emphasizing point $H_{Ref}$ and the horizontal coordinate of the current touch signal TOUCH as the emphasizing region 110 (step S240).

An image having an emphasizing luminance and a background luminance in the emphasizing region 110 and the background region 120, respectively, is displayed (step S260). The information processing part 2500 generates the dynamic luminance information DL based on the stored touch signal S_TOUCH from the storing part 2400, the reference emphasizing point $H_{Ref}$ and the current touch signal TOUCH from the touch panel 300 to apply the dynamic luminance information DL to the display panel 100. The dynamic luminance information DL includes the emphasizing region 110 and the background region 120. The display panel 100 displays an image having higher luminance in the emphasizing region 110 and lower luminance in the background region 120.

The steps S210 to S260 are repeated.

According to the present example embodiment, although the display apparatus or the finger 50 is disturbed, the reference emphasizing point $H_{Ref}$ is set based on the first touch point, thereby securely determining the emphasizing region 110.

Figure 12:
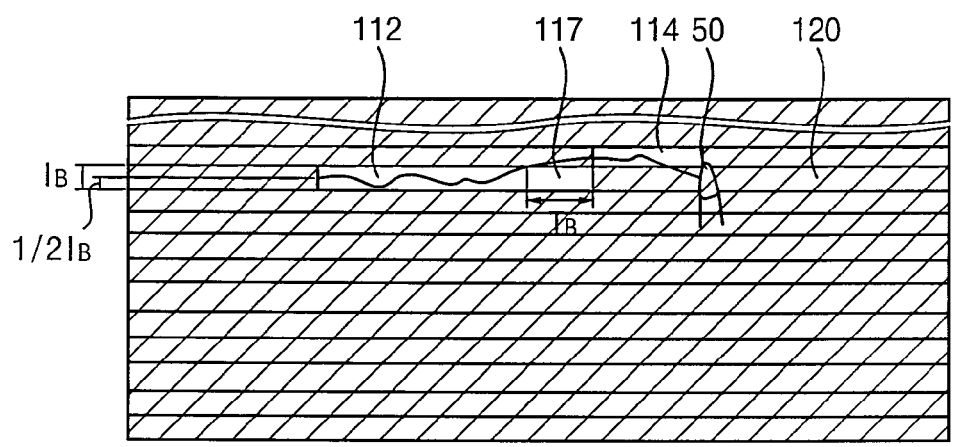
FIG. 12 is a plan view illustrating a method of driving a display apparatus according to further still another example embodiment of the present invention.
Figure 13:
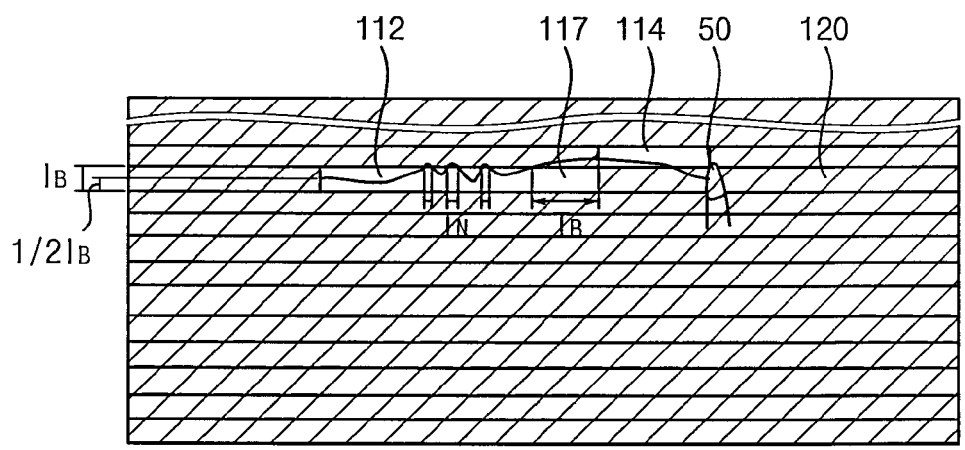
FIG. 13 is a plan view illustrating another driving method of driving the display apparatus of FIG. 12.
Figure 14:
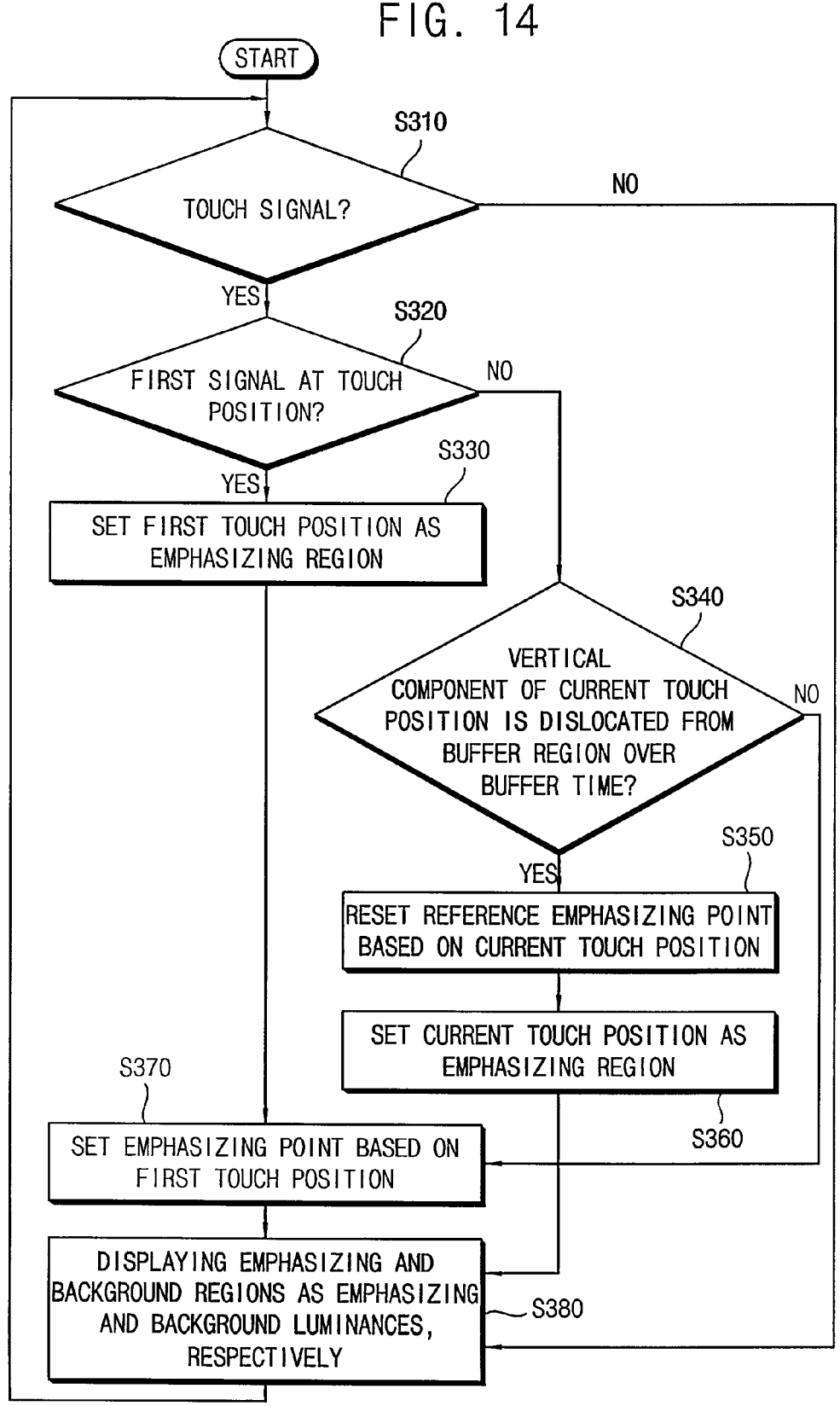
FIG. 14 is the flowchart illustrating a method of driving the display apparatus of FIG. 12.
Figure 15:
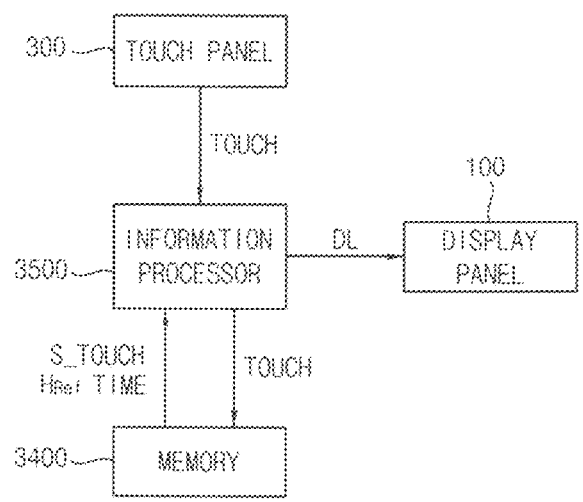
FIG. 15 is a block diagram illustrating the display apparatus of FIG. 12.

FIG. 12 is a plan view illustrating a method of driving a display apparatus according to further still another example embodiment of the present invention. FIG. 13 is a plan view illustrating another driving method of driving the display apparatus of FIG. 12. FIG. 14 is the flowchart illustrating a method of driving the display apparatus of FIG. 12. FIG. 15 is a block diagram illustrating the display apparatus of FIG. 12. The display apparatus of FIGS. 12 to 15 is substantially the same as shown in FIGS. 1 to 4 except a buffer region. Thus, any repetitive explanations concerning the same elements will be omitted.

Referring to FIGS. 12 to 15, the display apparatus includes a display panel 100, a touch panel 300, a storing part 3400 and an information processing part 3500.

The display panel 100 receives dynamic luminance information DL from the information processing part 3500 to display an image with different luminances in a plurality of emphasizing regions 112 and 114, a buffer region 117 and a background region 120, respectively. For example, the emphasizing regions 112 and 114 may have substantially the same luminance as the buffer region 117, and the background region 120 may have greater luminance than the emphasizing regions 112 and 114 and the buffer region 117.

The touch panel 300 is disposed on the display panel 100. For example, the touch panel 300 is integrally formed with the display panel 100. The touch panel 300 includes a plurality of touch sensors. The touch panel 300 senses the touch that is externally provided from the touch panel 300 to generate a current touch signal TOUCH. The current touch signal TOUCH includes a touch position information that has a horizontal coordinate and a vertical coordinate. The current touch signal TOUCH generated from the touch panel 300 is applied to the information processing part 3500.

The storing part 3400 receives the current touch signal TOUCH and an information of a reference emphasizing point $H_{Ref}$ from the information processing part 3500 to store the current touch signal TOUCH and an information of a reference emphasizing point $H_{Ref}$. For example, the storing part 3400 sequentially receives the current touch signal TOUCH to sequentially store the current touch signals as stored touch signals S_TOUCH. In the present example embodiment, the storing part 3400 also stores a predetermined buffer time $T_B$.

The information processing part 3500 receives the stored touch signal S_TOUCH from the storing part 3400, the stored information of the reference emphasizing point $H_{Ref}$ from the storing part 3400, the stored buffer time $T_B$ from the storing part 3400 and the current touch signal TOUCH from the touch panel 300 to generate the dynamic luminance information DL.

The reference emphasizing point $H_{Ref}$ corresponds to a vertical coordinate of a center of a first touch without dislocation of a finger 50 or a center of a first touch with the dislocation out of a buffer interval $I_B$ and beyond a buffer time $T_B$ of the finger 50.

The information processing part 3500 extracts a horizontal coordinate of the current touch signal TOUCH and the stored touch signal S_TOUCH and a vertical coordinate of the reference emphasizing point $H_{Ref}$ to determine the emphasizing regions 112 and 114 and the buffer region 117. Also, the remaining region of the display panel 100 except the emphasizing regions 112 and 114 and the buffer region 117 is set to be the background region 120. The dynamic luminance information DL includes the arrangement of the emphasizing regions 112 and 114, the buffer region 117 and the background region 120.

The information processing part 3500 applies the dynamic luminance information DL to the display panel 100.

Referring again to FIGS. 12 to 15, the method of driving the display apparatus is as follows. The touch signal TOUCH is detected (step S310). When the touch panel 300 is touched by the finger 50, the touch panel 300 generates the current touch signal TOUCH to apply the current touch signal TOUCH to the information processing part 3500. When the information processing part 3500 receives the current touch signal TOUCH from the touch panel 300, the current touch signal TOUCH is determined to be detected. The current touch signal TOUCH includes the information of the touch position and a touch time. When the current touch signal TOUCH is not detected, the process proceeds to step S380.

The touch position of the current touch signal TOUCH is compared with a stored touch signal S_TOUCH to determine whether the current touch signal TOUCH is a first signal (step S320). When the touch position and the touch time of the stored touch signal S_TOUCH is adjacent to the current touch signal TOUCH, the information processing part 3500 determines that the stored touch signal S_TOUCH is the first signal.

When the stored touch signal S_TOUCH is the first signal, the information processing part 3500 set the emphasizing region 112 with reference to a first touch position corresponding to the first signal (step S330), and a vertical coordinate of the first touch position is set to be the reference emphasizing point $H_{Ref}$ (step S370).

When the stored touch signal S_TOUCH is not the first signal, the information processing part 3500 detects whether the vertical coordinate of the current touch position of the current touch signal TOUCH is disposed out of the buffer interval $I_B$ beyond the buffer time $T_B$ that is stored in the storing part 3400 (step S340). The buffer inter $I_B$ is determined with respect to the reference emphasizing point $H_{Ref}$.

When the vertical coordinate of the current touch position of the current touch signal TOUCH is disposed out of the buffer interval $I_B$ beyond the buffer time $T_B$, the information processing part 3500 resets a new reference emphasizing point $H_{Ref}$ based on the vertical coordinate of the current touch position of the current touch signal TOUCH (step S350). The new reference emphasizing point $H_{Ref}$ is stored in the storing part 3400. Also, the information processing part 3500 sets the current touch position as a new emphasizing region 114 (step S360). For example, a portion of old emphasizing region 112 adjacent to the new emphasizing region 114 within the buffer time $T_B$ is set to be the buffer region 117.

An image having the emphasizing and background luminances is displayed in the emphasizing regions 112 and 114 and the background region 120, respectively (step S380). Also, the buffer region 117 is displayed at the emphasizing luminance as a portion of the old emphasizing region 112.

The steps S310 to S380 are repeated.

According to the present example embodiment, although the display apparatus or the finger is agitated during the touch, the reference emphasizing point $H_{Ref}$ is determined based on the first touch position or the reference emphasizing point $H_{Ref}$ is newly determined based on the dislocation of the finger 50. Thus, the emphasizing regions 112 and 114 may be securely determined, and may have various shapes.

Figure 16:
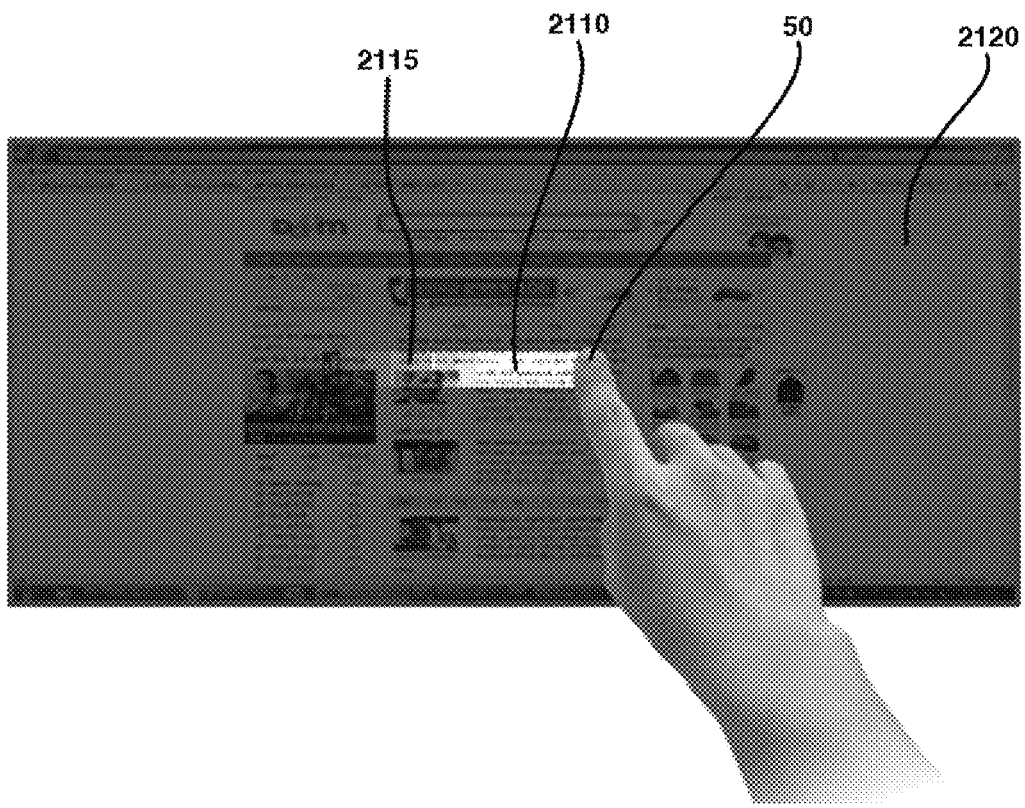
FIG. 16 is an image illustrating a method of driving a display apparatus according to further still another example embodiment.
Figure 17:
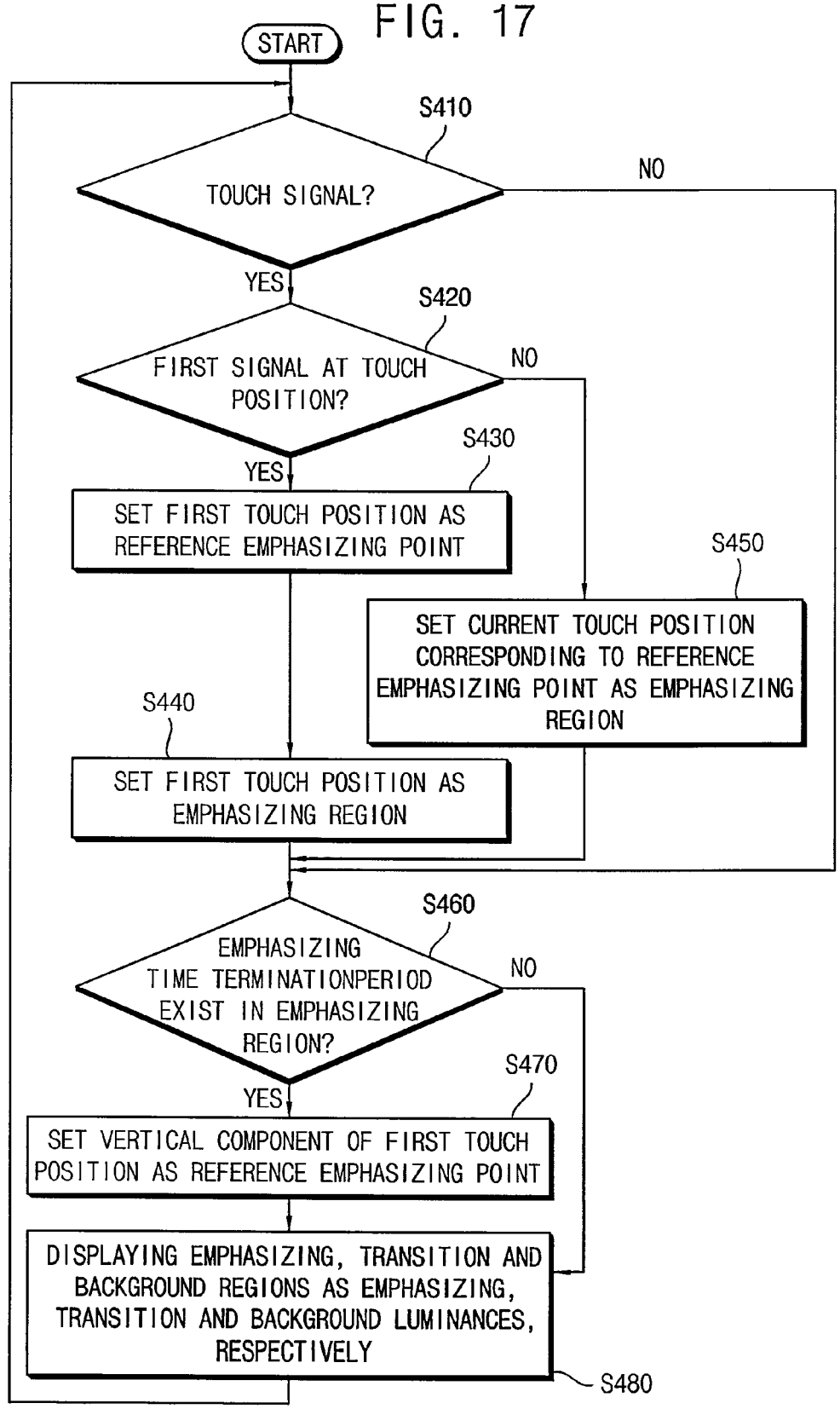
FIG. 17 is a block diagram illustrating the display apparatus of FIG. 16.

FIG. 16 is an image illustrating a method of driving a display apparatus according to further still another example embodiment of the present invention. FIG. 17 is a block diagram illustrating the display apparatus of FIG. 16. The display apparatus of FIGS. 16 and 17 is substantially the same as shown in FIGS. 1 to 4 except the information processing part and the storing part. Thus, any repetitive explanations concerning the same elements will be omitted.

Referring to FIGS. 16 and 17, the display apparatus includes a display panel 100, a touch panel 300, a storing part 4400 and an information processing part 4500.

The display panel 100 receives dynamic luminance information DL from the information processing part 4500 to display an image with different luminances in an emphasizing region 2110, a transition region 2115 and a background region 2120, respectively. For example, the emphasizing region 2110 has greater luminance than the transition region 2115, and the transition region 2115 has greater luminance than the background region 2120. For example, the transition region 2115 may have one luminance. Alternatively, the transition region may be divided into a plurality of sub transition regions having different luminances that gradually change.

The touch panel 300 is disposed on the display panel 100. For example, the touch panel 300 is integrally formed with the display panel 100. The touch panel 300 includes a plurality of touch sensors. The touch panel 300 senses the touch that is externally provided from the touch panel 300 to generate a current touch signal TOUCH. The current touch signal TOUCH includes a touch position information that has a horizontal coordinate and a vertical coordinate and a touch time information. The current touch signal TOUCH generated from the touch panel 300 is applied to the information processing part 4500.

The storing part 4400 receives the current touch signal TOUCH including the touch position information and the touch time information and an information of a reference emphasizing point $H_{Ref}$ from the information processing part 4500 to store the current touch signal TOUCH and the information of the reference emphasizing point $H_{Ref}$. For example, the storing part 4400 also stores a predetermined reference transition time and a termination time.

The information processing part 4500 receives a stored touch signal S_TOUCH stored in the storing part 4400, the information of the reference emphasizing point $H_{Ref}$, the touch time information TIME' stored in the storing part 4400 and the current touch signal TOUCH from the touch panel 300 to generate dynamic luminance information DL.

The information processing part 4500 compares the stored touch time information TIME' stored in the storing part 4400, the reference transition time and the termination time. When the touch time information TIME' corresponding to each of the stored touch signals S_TOUCH is between the reference transition and the termination time, the information processing part 4500 sets the position of the stored touch signal S_TOUCH as the transition region 2115. Also, when the touch time information TIME' corresponding to each of the stored touch signals S_TOUCH exceeds the termination time, the information processing part 4500 sets the position of the stored touch signal S_TOUCH as the background region 2120.

The information processing part 4500 extracts a horizontal coordinate of the current touch signal TOUCH and the stored touch signal S_TOUCH and a vertical coordinate of the reference emphasizing point $H_{Ref}$, and determines the emphasizing region 2110, the transition region 2115 and the background region 2120 based on the extracted horizontal and vertical coordinates and the touch time information TIME' corresponding to each of the stored touch signals S_TOUCH. The dynamic luminance information DL includes an information of an arrangement of the emphasizing region 2110, the transition region 2115 and the background region 2120.

The information processing part 4500 applies the dynamic luminance information DL to the display panel 100.

Figure 18:
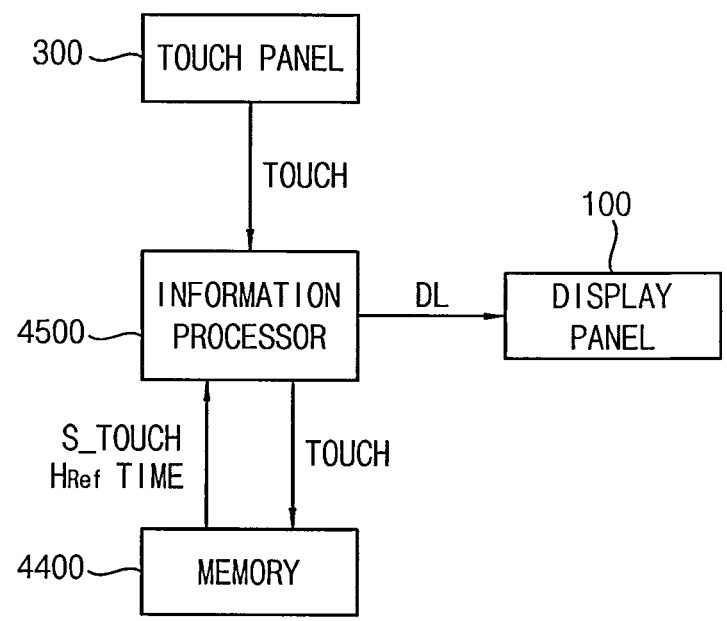
FIG. 18 is a flowchart illustrating the method of driving the display apparatus of FIG. 16.

FIG. 18 is a flowchart illustrating the method of driving the display apparatus of FIG. 16.

Referring to FIGS. 16 to 18, the touch signal TOUCH is detected (step S410). When the touch panel 300 is touched by the finger 50, the touch panel 300 generates the current touch signal TOUCH to apply the current touch signal TOUCH to the information processing part 4500. When the information processing part 4500 receives the current touch signal TOUCH from the touch panel 300, the current touch signal TOUCH is determined to be detected. The current touch signal TOUCH includes the information of the touch position and the touch time information. When the current touch signal TOUCH is not detected, the process proceeds to step S460.

The current touch signal TOUCH is compared with the stored touch signal S_TOUCH to detect if the stored touch signal S_TOUCH is the first signal (step S420). When the position of the stored touch signal S_TOUCH is adjacent to the position of the current touch signal TOUCH, the information processing part 4500 determines that the stored touch signal S_TOUCH is the first signal.

When the current touch signal TOUCH is the first signal, the vertical coordinate of the first touch position is set to be the reference emphasizing point $H_{Ref}$ (step S430), and the information processing part 4500 determines the emphasizing region 2110 with reference to the first touch position (step S440).

When the current touch signal TOUCH is not the first signal, the information processing part 4500 extracts the horizontal coordinate of the current touch position to determine the emphasizing region 2110 based on the horizontal coordinate of the current touch position and the reference emphasizing point HRef that is the vertical coordinate of the emphasizing region 2110 (step S450).

The information processing part 4500 compares the stored touch time information TIME' corresponding to the stored touch signal S_TOUCH in the emphasizing region 2110 with the predetermined reference transition time and the predetermined termination time to detect if a region in which the emphasizing time is terminated exists (step S460). When the stored touch time information TIME' corresponding to the stored touch signal S_TOUCH exceeds the reference transition time, the portion of the emphasizing region 2110, in which the stored touch time information TIME' exceeds that reference transition time, is changed into the transition region 2115 (step S470). When the stored touch time information TIME' corresponding to the stored touch signal S_TOUCH exceeds the termination time, the portion of the transition region 2115, in which the stored touch time information TIME' exceeds the termination time, is changed into the background region 2120.

The display panel 100 displays the image having the emphasizing region 2110, the transition region 2115 and the background region 2120 with the emphasizing luminance, the transition luminance and the background luminance, respectively (step S480).

The steps S410 to S480 are repeated.

According to the present example embodiment, the information processing part 4500 compares the touch time information TIME' with the reference transition time and the termination time to set the emphasizing region 2110, the background region 2120 and the transition region 2115 that is interposed between the emphasizing region 2110 and the background region 2120. Thus, an image having smoother fading may be displayed.

In the above-mentioned example embodiments, the emphasizing regions are arranged in the horizontal direction. Alternatively, the emphasizing region may be arranged in the vertical direction.

According to at least one of the disclosed embodiments, the display apparatus has the emphasizing and background regions in which the luminance is dynamically changed by the touch signal to be dynamic individual touch controlled. Thus, the power consumption of the display apparatus is decreased, and a viewing angle is increased.

Furthermore, the emphasizing region is determined by touch of the finger, the pointer, etc., and the emphasizing region has greater luminance than the background region. Thus, the emphasizing region is formed only in the region touched by the finger, thereby decreasing the power consumption of the display apparatus. Also, a plurality of the emphasizing regions may be formed by various touches of the finger. Furthermore, the display apparatus may have the backlight assembly including a plurality of light sources that are individually driven, so that the light having high luminance may be supplied only in the emphasizing regions, thereby decreasing the power consumption of the backlight assembly.

Also, the luminance of the emphasizing region may be lower than the background region, so that the image may be easily recognized in a bright atmosphere. In addition, although the display apparatus of the finger is agitated during the touch, the reference emphasizing point is determined with respect to the first touch position so that the emphasizing region is securely determined. Also, although the display apparatus or the finger is agitated, the reference emphasizing point is determined with respect to the first touch position or is newly determined based on the dislocation of the finger. Thus, the emphasizing region is securely determined, and various emphasizing regions may be determined.

Furthermore, the information processing part compares the touch time information with the reference transition time and the termination time to determine the transition region between the emphasizing region and the background region. Thus, the image having the smoother fading effect may be displayed.

The present inventive concept may be applied to an electric device having an organic light emitting display device. For example, the present inventive concept may be applied to a television, a computer monitor, a laptop, a digital camera, a cellular phone, a smart phone, a personal digital assistant (PDA), a portable multimedia player (PMP), a MP3 player, a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display apparatus comprising:
    a touch panel configured to generate a current touch signal including a current touch position of a touch;
    an information processor configured to receive the current touch signal from the touch panel and a stored touch signal to compare the stored touch signal with the current touch signal to generate dynamic luminance information;
    a memory configured to receive the current touch signal from the information processor to store the current touch signal as the stored touch signal; and
    a display panel configured to receive the dynamic luminance information from the information processor and provide different amounts of power to pixels so as to display an image having different luminances in an emphasizing region corresponding to the current touch signal and the stored touch signal and a background region surrounding the emphasizing region, respectively,
    wherein the current touch signal further comprises touch time information, wherein the information processor is configured to compare touch time information of the stored touch signal with a reference transition time and a termination time to change a portion of the emphasizing region, which corresponds to a touch position of the stored touch signal, into a transition region when the touch time information exceeds the reference transition time, and wherein the information processor is further configured to change a portion of the transition region, which corresponds to the touch position of the stored touch signal, into the background region when the touch time information exceeds the termination time.

2. The display apparatus of claim 1, wherein the luminance of the emphasizing region is greater than the luminance of the background region.

3. The display apparatus of claim 1, wherein the luminance of the emphasizing region is lower than the luminance of the background region.

4. The display apparatus of claim 1, wherein the touch panel is integrally formed with the display panel.

5. The display apparatus of claim 1, wherein the touch panel is configured to be successively touched, and wherein the emphasizing region is configured to expand based on the successive touch of the touch panel.

6. The display apparatus of claim 1, wherein the emphasizing region has a width corresponding to a predetermined buffer interval.

7. The display apparatus of claim 1, wherein the emphasizing region is one successive region.

8. The display apparatus of claim 1, wherein the emphasizing region includes a plurality of disconnected regions.

9. A display apparatus comprising:
a touch panel configured to generate a current touch signal having a touch position information of a touch;
an information processor configured to receive the current touch signal from the touch panel and a stored touch signal to compare the stored touch signal and the current touch signal, and generate dynamic luminance information and an image signal;
a memory configured to receive the current touch signal from the information processor to store the current touch signal as the stored touch signal;
a display panel configured to receive the image signal from the information processor to display an image; and
a backlight assembly including a plurality of individually driving light sources, and configured to receive the dynamic luminance information from the information processor and provide different amounts of power to pixels so as to generate light having different luminances in an emphasizing region corresponding to the stored touch signal and a background region surrounding the emphasizing region,
wherein the current touch signal further comprises touch time information, wherein the information processor is configured to compare touch time information of the stored touch signal with a reference transition time and a termination time to change a portion of the emphasizing region, which corresponds to a touch position of the stored touch signal, into a transition region when the touch time information exceeds the reference transition time, and wherein the information processor is further configured to change a portion of the transition region, which corresponds to the touch position of the stored touch signal, into the background region when the touch time information exceeds the termination time.

10. A method of driving a display apparatus including a display panel and a touch panel integrally formed with the display panel, the method comprising:
detecting a current touch signal including touch position information;
determining a current touch position as a portion of an emphasizing region when the touch position information of the current touch signal is not disposed in the emphasizing region;
providing different amounts of power to pixels so as to display an image having an emphasizing luminance and a background luminance that is different from the emphasizing luminance in the emphasizing region and a background region that surrounds the emphasizing region, respectively, to dynamic individual control the display panel;
storing the current touch signal to generate a stored touch signal, wherein the current touch signal further comprises touch time information; and
comparing the touch time information of the stored touch signal to change a portion of the emphasizing region, which corresponds to a touch position of the stored touch signal, into a transition region, when the touch time information exceeds the reference transition time.

11. The method of claim 10, wherein the emphasizing region is determined by comparing the current touch signal with the stored touch signal.

12. The method of claim 10, wherein the luminance of the emphasizing region is greater than the luminance of the background region.

13. The method of claim 10, wherein the luminance of the emphasizing regions is lower than the luminance of the background region.

14. The method of claim 10, further comprising comparing the touch time information of the stored touch signal to change a portion of the transition region, which corresponds to a touch position of the stored touch signal, into the background region, when the touch time information exceeds the termination time, and
wherein the luminance of the transition region is between the luminance of the emphasizing region and the luminance of the background region.

15. The method of claim 10, wherein the current touch signal further comprises touch time information, and
wherein the method further comprises:
detecting whether the current touch signal is a first signal; and
setting a vertical coordinate of the current touch signal as a reference emphasizing point when the current touch signal is the first signal.

16. The method of claim 14, further comprising newly setting a vertical coordinate of the touch position information as the reference emphasizing point when the touch time information of the current touch signal exceeds a buffer time and the vertical coordinate of the touch position information of the current touch signal exceeds a buffer interval.

* * * * *